United States Patent [19]

Fukuda et al.

[11] Patent Number: 5,447,676
[45] Date of Patent: Sep. 5, 1995

[54] LOW-PRESSURE AND LOW-TEMPERATURE MOLDABLE COMPOSITION AND SHAPED ARTICLE THEREFROM

[75] Inventors: Yoshihiro Fukuda, Nishinomiya; Haruyuki Yonehara, Tokyo; Hiromu Miyashita, Kamakura, all of Japan

[73] Assignee: Takeda Chemical Industries, Ltd., Osaka, Japan

[21] Appl. No.: 137,978

[22] Filed: Oct. 19, 1993

[30] Foreign Application Priority Data

Oct. 19, 1992 [JP] Japan .................. 4-280266

[51] Int. Cl.$^6$ .................. C08J 5/04; C08L 67/06
[52] U.S. Cl. .................. 264/331.18; 523/510; 523/514; 523/516; 523/521; 523/527
[58] Field of Search .................. 325/27; 323/510, 514, 323/521; 264/331.18

[56] References Cited

U.S. PATENT DOCUMENTS

| | | | |
|---|---|---|---|
| 3,227,665 | 1/1966 | Fourcade | 523/510 |
| 4,100,224 | 7/1978 | Hess | 525/64 |

FOREIGN PATENT DOCUMENTS

| | | |
|---|---|---|
| 1282958 | 11/1968 | Germany . |
| 2252972 | 5/1973 | Germany . |
| 58-8718 | 1/1983 | Japan . |
| 1502889 | 3/1978 | United Kingdom . |
| WO91/06604 | 5/1991 | WIPO . |

OTHER PUBLICATIONS

Dainippon Ink Chem. K.K., Database WPI, Week 7926, Derwent Publications, Ltd., London AN79-47863B JP-A-54061266, 17 May 1979.

*Primary Examiner*—Patricia A. Short
*Attorney, Agent, or Firm*—Wenderoth, Lind & Ponack

[57] ABSTRACT

The unsaturated polyester resin molding composition of the invention comprising an unsaturated polyester, a vinyl monomer, a stabilizer, a thermoplastic resin, an organic peroxide, a fluidity modifier, a thickening agent, a filler and a fibrous reinforcement material possesses curability at low temperatures of about 50° to 120° C., good fluidity and filling property on the occasion of molding at low pressures of about 0.1 to 20 kgf/cm$^2$, and good storage stability at room temperature.

2 Claims, No Drawings

LOW-PRESSURE AND LOW-TEMPERATURE MOLDABLE COMPOSITION AND SHAPED ARTICLE THEREFROM

The present invention relates to a molding composition which is useful as a material for producing large-sized molded articles such as residential use materials, railroad car parts and automotive exterior parts. The composition is moldable under lower temperature, lower pressure conditions than in the prior art, has good storage stability and occurs in a sheet or bulk form. The invention also provides a method of producing molded articles and the molded articles produced.

Fiber-reinforced plastics (FRP) produced by using unsaturated polyester resins have excellent mechanical strength, heat resistance, water resistance and chemical resistance and can be obtained with high productivity. They have widely diverse applications in bathtubs, water tank panels, washbowls, etc.

Among the known FRP molding methods, the compression molding method for unsaturated polyester-based sheet molding compounds (SMC) or thick molding compounds (TMC), which uses a hydraulic press and accounts for about 30% of the FRP production, is a mechanized and labor-saving one showing high productivity and is suited for the production scale of about 1,000 to 5,000 pieces per month, as in the case of such residential equipments as bathtubs or such automotive parts as spoilers.

Said method is carried out in closed systems and is therefore free of dispersion or scattering of styrene and glass fiber. It can be carried out under fairly improved working conditions as compared with the conventional open mold molding methods such as the hand lay-up (HLU) method or spray-up (SPU) method.

However, compression molding of SMC or TMC using a hydraulic press requires a large amount of equipment investment, for example an expensive hydraulic press for molding, expensive molds that are made of steel resistant to high temperatures of 120° to 160° C. and high pressures of 20 to 150 kgf/cm$^2$ (Japanese Patent Publication S60-31644), for instance, hence structurally very durable, but requires a long time for manufacture, and a mold temperature adjusting equipment including steam, heating oil and electric heaters.

Particularly in cases where those molded residential equipment parts or railroad car parts that have recently become large-sized are produced on a scale of 100 pieces or less per month, the total investment becomes so large that when the depreciation expenses, per piece of product, for the equipment and molds are taken into consideration, the press molding method can hardly be employed for SMC and TMC. Therefore, such molded articles are currently produced by the conventional HLU or SPU method. These open mold techniques, however, have problems: the working conditions are made worse by scattering of the resin and glass fiber or evaporation of styrene; there is a shortage of skilled labor; a long curing time is required and the productivity per molded article is low; the decrease in the number of FRP mold manufacturers causes the mold manufacturing time to become longer and the mold manufacturing cost to increase; and abruptly increased demands cannot be satisfied.

In an attempt to solve the problems mentioned above and produce large-sized molded articles on a small scale efficiently at a low cost of equipment and under good working conditions, the present inventors made molding tests under low temperature, low pressure conditions using the conventional molding compositions. However, with the conventional molding compositions, the results obtained were far from satisfying the requirements mentioned above. Thus, for ensuring a sufficient level of curability while lowering the conventional curing temperature of 120° to 160° C. down to the lower temperature region of 50° to 120° C., it is necessary to use a reaction initiator highly reactive and decomposable at low temperatures. However, when such an initiator is used, the storage stability of the conventional molding compositions at room temperature or below is markedly deteriorated, posing a problem from the practical viewpoint. When a polymerization inhibitor well known in the art, for example parabenzoquinone, is used in large proportions, the storage stability is indeed improved but the curability in the low temperature region is much reduced, hence molded articles remain uncured. None of the conventional molding compositions has curability in the low molding temperature region of 50° to 120° C., together with room temperature storage stability and sufficient fluidity in molds at a low region molding pressure of 20 kgf/cm$^2$ or below. None of them can give molded articles having good appearance and problem-free strength characteristics without causing molding defects or faults such as short shot, voids, cutouts and pinholes. It has been tried to reduce viscosity of the molding composition by reducing the amounts of a thickening agent and a filler, so that the molding composition is moldable at a low pressure. In these methods, however, it is hardly possible to peel off from the molding composition the films of polyethylene, polypropylene or nylone which is used in SMC and TMC. For solving the above problems, it is essential to develop a molding composition optimal for low-temperature, low-pressure molding.

It is an object of the invention to provide a molding composition which is curable in the low temperature region, has good storage stability at ambient temperature and shows good fluidly and filling property in the low pressure region.

The present invention is concerned with a molding composition which comprises an unsaturated polyester, a vinyl monomer, a stabilizer, a thermoplastic resin, an organic peroxide, a fluidity modifier, a thickening agent, a filler and a fibrous reinforcement material and which is moldable at a pressure of about 0.1 to 20 kgf/cm$^2$ and a temperature of about 50° to 120° C., a method of producing molded articles using said composition, and molded articles obtained by curing said composition.

The molding composition mentioned above is curable at low temperatures, has good fluidity under low pressure conditions, shows very good storage stability and affords molded articles having good mechanical strength, heat resistance, water resistance, chemical resistance, and surface properties (surface smoothness, paintability).

The molding composition of the invention is excellent in moldability, curability and filling property under low temperature, low pressure conditions and is useful as a molding composition in producing large-sized railroad car parts, residential appliances and parts, and so forth. Furthermore, said molding composition has good curability at low temperatures of about 50° to 120° C. and very good storage stability at room temperature and, in addition, shows sufficient fluidity under low pressure conditions of about 20 kgf/cm$^2$ or below. Therefore, said composition can afford molded articles in a satisfactory manner using a pair of mold halves, male and female, such as a resin mold, electroformed mold, ZAS mold, aluminum alloy mold, copper alloy mold or cast iron mold, without using a large-sized and expensive hydraulic press and a steel mold as required by the conventional molding composition.

Unlike in the prior art, mold clamping using an expensive hydraulic press is unnecessary provided that the molding temperature and molding pressure are within the respective ranges mentioned above. Pressures sufficient for attaining flowing and filling of the molding composition in and into molds can be produced, for example, by providing the molds themselves with a plurality of cylinders that can be actuated by a hydraulic or pneumatic pressure.

The unsaturated polyester to be used in the composition of the invention may be any of those conventional ones synthesized by condensation of an $\alpha,\beta$-olefinically unsaturated dicarboxylic acid and a bifunctional glycol. In combination with these two components, a saturated dicarboxylic acid or aromatic dicarboxylic acid and/or dicyclopentadiene, which is capable of reacting with carboxylic acids, may further be used. As examples of said $\alpha,\beta$-olefinically unsaturated dicarboxylic acid, there may be mentioned, among others, maleic acid, fumaric acid, itaconic acid, citraconic acid and anhydrides of these dicarboxylic acids. Examples of the dicarboxylic acid to be used in combination with such $\alpha,\beta$-olefinically unsaturated dicarboxylic acids are adipic acid, sebacic acid, succinic acid, phthalic anhydride, isophthalic acid, terephthalic acid, tetrahydrophthalic acid, HET acid and the like.

The bifunctional glycol to be used is, for example, an alkanediol, an oxaalkanediol, or a diol derived from bisphenol A or brominated bisphenol A by addition of ethylene oxide or propylene oxide thereto. A monool and/or a trifunctional triol may be used additionally. Examples of the alkanediol are ethylene glycol, 1,2-propylene glycol, 1,3-propylene glycol, 2-methylpropane-1,3-diol, 1,4-butanediol, neopentyl glycol, 1,5-pentanediol, 1,6-hexanediol, cyclohexanediol, cyclohexanedimethanol, hydrogenated bisphenol A and the like. Examples of the oxaalkanediol are dioxyethylene glycol, dioxypropylene glycol, trioxyethylene glycol, etc. As the monohydric or trihydric alcohol to be used in combination with such glycols, there may be mentioned octyl alcohol, oleyl alcohol, trimethylolpropane and glycerol.

Generally, the unsaturated polyester is synthesized under heating while the reaction is expedited by removing the byproduct water. For use in the composition of the invention, said polyester can generally have a molecular weight of 800 to 4,000 and an acid value of 20 to 60. It is used in an amount of 20 to 50 parts by weight, preferably 25 to 35 parts by weight, per 100 parts by weight of the sum of the unsaturated polyester, vinyl monomer and thermoplastic resin. Generally, the unsaturated polyester is used in the form of an unsaturated polyester resin composition prepared by dissolving said unsaturated polyester in 30 to 150 parts by weight, per 100 parts by weight of the unsaturated polyester, of the vinyl monomer to be mentioned below.

As the vinyl monomer to be used in the composition of the invention, there may be mentioned monovinyl monomers, for example aromatic monovinyl monomers such as styrene, parachlorostyrene and vinyltoluene, and acrylic monovinyl monomers such as acrylic acid, butyl acrylate, methacrylic acid, methyl methacrylate and acrylonitrile. The vinyl monomer is used in an amount of 20 to 60 parts by weight, preferably 30 to 50 parts by weight, per 100 parts by weight of the sum of the unsaturated polyester, vinyl monmer and thermoplastic resin. The vinyl monomer is incorporated in the composition generally as a reactive diluent for the unsaturated polyester mentioned above and for the thermoplastic resin to be mentioned later herein.

The stabilizer to be used in the practice of the invention should preferably be one showing high polymerization inhibiting effect at or in the vicinity of room temperature, such as BHT (di-tertiarybutylhydroxytoluene), TBC (para-tertiarybutylcatechol), MTBHQ (mono-tertiarybutylhydroquinone), hydroquinone monomethyl ether or BHA (butylated hydroxyanisole). The stabilizer is used in an amount of 0.01 to 1.0 part by weight, preferably 0.05 to 0.5 part by weight, more preferably 0.2 to 0.5 part by weight, per 100 parts by weight of the sum of the unsaturated polyester, vinyl monomer and thermoplastic resin. Among the stabilizer species mentioned above, BHT is particularly preferred. Any industrial or food additive grade of BHT can be used. Within the temperature range from room temperature (25° C.) to the maturing temperature (40° C.) for SMC or TMC, BHT serves as a very potent radical scavenger against radicals formed in trace amounts from the organic peroxide incorporated as a polymerization initiator, thus markedly improving the storage stability of SMC or TMC. On the other hand, within the temperature range of about 120° to 160° C., in which molding of SMC or TMC is generally carried out, BHT is very weak in radical scavenger activity and causes no delay in the curing reaction, as compared with other well known polymerization inhibitors such as parabenzoquinone and hydroquinone. BHT will not adversely affect the fluidity in molds or the surface properties of molded articles. Depending on the molding conditions for SMC or TMC, such polymerization inhibitors as parabenzoquinone and hydroquinone may be used in combination with BHT for adjusting the rate of curing. When these polymerization inhibitors are used, they are used in an amount of 0.001 to 0.1 part by weight, preferably 0.005 to 0.03 part by weight, per 100 parts by weight of the unsaturated polyester resin composition composed of the unsaturated polyester, vinyl monomer and thermoplastic-resin, namely the sum of these. When, however, these polymerization inhibitors are used alone, the storage stability at room temperature will be insufficient. When they are used in a proportion exceeding 0.1 part by weight, incomplete low temperature curing will result, markedly deteriorating the strength and surface properties of molded articles.

The thermoplastic resin to be used in accordance with the invention may be any of those thermoplastic resins that are conventionally used as low profile additives for unsaturated polyester resins. As examples of such thermoplastic resins, there may be mentioned polystyrene, polybutadiene and hydrogenated modifications thereof, polyisoprene and hydrogenated modifications thereof, aromatic vinyl/conjugated diene block copolymers and hydrogenated modifications thereof, styrene/vinyl acetate block copolymers, polyvinyl acetate, polymethyl methacrylate and the like. Mention may further be made of saturated polyesters (molecular weight: 300 to 100,000) and polyurethane derivatives thereof, polyethers and the like. They are used in a proportion of 5 to 40 parts by weight, preferably 15 to 30 parts by weight, per 100 parts of the unsaturated polyester resin composition.

The thermoplastic resin to be used in the composition of the invention may be carboxy modification of any of the polymers mentioned above. Such a carboxy-containing polymer shows improved comptatibility with the unsaturated polyester resin and, in preparing SMC, TMC or BMC, it can contribute to improve the thickening of the molding Compound by the action of magnesium oxide or magnesium hydroxide.

As the organic peroxide to be used in the practice of the invention, at least one is selected, depending on the desired rate of curing, from among those organic peroxides which are decomposable in the low temperature range of about 60° to 100° C., for example tertiary-butyl peroxy 2-ethylhexanoate (TBPO), 2,5-dimethyl-2,5-di(-benzoylperoxy)cyclohexane (DDBPH), tertiary-amyl-2-ethylhexanoate (TAPO) and tertiary-butyl isopropyl carbonate (TBIPC) tertiary-hexylperoxy 2-ethylhexanoate, 1,1,3,3-tetramethylbutylperoxy 2-ethylhexanoate, tertiary-hexylperoxypivalate, tertiarybutylperoxy pivalate and 2,5-dimethyl-2,5-di(2-ethylhexanoylperoxy)cyclohexane. These are used in a proportion of 0.5 to 5 parts by weight, preferably 1.0 to 3.0 parts by weight, per 100 parts by weight of the unsaturated polyester resin composition composed of the unsatruated polyester, vinyl monomer and thermoplastic resin. Any of the organic peroxides that are decomposable at 100° C. or above and are used in SMC, for example tertiary-butyl peroxybenzoate (TBPB), may be used combinedly.

In the practice of the invention, a curing promoter may be used in combination with the organic peroxide mentioned above. As the curing promoter, there may be mentioned, among others, organic metal compounds or acetylacetonates of cobalt, copper or manganese. These may be used either singly or in admixture.

These organic metal compounds are incorporated in a proportion of 10 to 1,000 ppm, as the metal, based on the unsaturated polyester resin composition.

In accordance with the invention, the fluidity modifier is used for the purpose of improving the fluidity of the unsaturated polyester resin composition in molds under low temperature, low pressure conditions. The fluidity modifier to be used in the composition of the invention may be a thixotropic agent or a viscosity reducing agent, for instance. Usable as the thixotropc agent are finely divided silica ($SiO_2$) (typically, synthesized by the high-temperature gaseous phase method, showing hydrophilicity or hydrophobicity), organoclay (e.g. amine-modified montmorillonite, etc.), vegetable oil-based ones (e.g. hydrogenated caster oil, etc.), amido compound of higher fatty acid (e.g. stearic acid, lauric acid, myristic acid, oleic acid, erucic acid, etc.), polyamide compounds (e.g. ethylenebisstearic amide, ethylenebisoleic amide, ethylenebiserucic amide, ethylenebislauric amide etc.), and inorganic ones. While one of these compounds may be singly used in the molding composition, two or more of these compounds may be used in combination therein. The finely divided silica to be used in the composition of the invention may be any highly dispersible silica powder commercially available as a thixotropic agent for unsaturated polyester resins, polyurethane resins and other resins, and generally has a bulk density of 30 to 120 g/liter, a mean primary particle size of 7 to 40 nm and a specific surface area (BET) of 50 to 500 $m^2/g$. Among such silica species, those having a specific surface area of 100 to 300 $m^2/g$ are preferred. As the viscosity reducing agent, there may be mentioned BYK-W900, -W960, -W965, -W971, -W972, -W980, -W990, -W995 (Produced by BYK Chemie GmbH), Superdyne-V-203, -V-204 (Produced by Takemoto oil & Fats Co. Ltd.), Alflow-P-10, -E-10, -S-10, -B-10 (Produced by Nippoh Oil & Fats Co. Ltd.), Nonion-K-230, -P-210, -S-220, -E-230 (Produced by Nippon Oil & Fats Co. Ltd.), Unister-H-476, -H334R, -H-481R (Produced by Nippon oil & Fats Co. Ltd.). The fluidity modifier is used in an amount of 0.1 to 5 parts by weight, preferably 0.2 to 3.0 parts by weight, per 100 parts by weight of the unsaturated polyester resin composition composed of the unsaturated polyester, vinyl monomer and thermoplastic resin.

Both the thickening agent and filler are incorporated into the molding composition of the invention. Further, internal mold releasing agent is usually incorporated.

As the thickening agent, there may be mentioned oxides, hydroxides and alcoholate of magnesium, calcium, aluminum and the like. Said agent is incorporated in a 10 proportion of 0.05 to 2.0 parts, preferably 0.2 to 1.0 part, more preferably 0.3 to 0.8 part by weight, per 100 parts of the unsaturated polyester resin composition composed of the unsaturated polyester, vinyl monomer and thermoplastic resin.

Examples of the filler are calcium carbonate, aluminum hydroxide, talc, silica, clay, glass powders and glass balloons. It is incorporated in a proportion of 50 to 200 parts by weight, preferably 80 to 180 parts by weight, more preferably 100 to 160 parts, per 100 parts of the unsaturated polyester resin composition composed of the unsaturated polyester, vinyl monomer and thermoplastic resin.

As the internal mold releasing agent, there may be mentioned higher fatty acids such as stearic acid, lauric acid, myristic acid, palmitic acid, etc., and non-alkali metal salt thereof such as zinc salt, magnesium salt, calcium salt, etc. Said agent is incorporated in a proportion of 0.05 to 20 parts, preferably 0.5 to 10 parts by weight, per 100 parts of unsaturated polyester composition composed of the unsaturated polyester, vinyl monomer and thermoplastic resin.

The unsaturated polyester resin molding composition of the invention may contain a pigment, when necessary or desired. As the pigment, there may be mentioned titanium oxide, carbon black, red iron oxide, phthalocyanine blue and the like. It is incorporated in a proportion of 0.5 to 20 parts by weight, preferably 2 to 15 parts by weight, per 100 parts of the unsaturated polyester resin composition composed of the unsaturated polyester, vinyl monomer and thermoplastic resin.

In the practice of the invention, an alkanepolyol polymethacrylate or an alkanepolyol polyacrylate may be incorporated into the composition of the invention to improve surface properties of the molded articles. As examples, there may be mentioned $C_2$–$C_{12}$ alkanepolyol dimethacrylates and diacrylates, such as ethylene glycol dimethacrylate, diethylene glycol dimethacrylate, triethylene glycol dimethacrylate, propylene glycol dimethacrylate, dipropylene glycol dimethacrylate, 1,4-butanediol dimethacrylate, neopentyl glycol dimethacrylate, 1,6-hexanediol dimethacrylate, ethylene glycol diacrylate, 1,3-propanediol diacrylate, 1,4-butanediol diacrylate, neopentyl glycol diacrylate, 1,6-hexanediol diacrylate, trimethylolpropane dimethacrylate, glycerol dimethacrylate, pentaerythritol dimethacrylate and trimethylolpropane diacrylate.

Further, there may be mentioned $C_{3-12}$ alkanepolyol polymethacrylates and polyacrylates, such as trimethylolpropane trimethacrylate, glycerol trimethacrylate, pentaerythritol trimethacrylate, glycerol triacrylate, pentaerythritol triacrylate, pentaerythritol tetramethacrylate, dipentaerythritol hexamethacrylate, pentaerythritol tetraacrylate and dipentaerythritol hexaacrylate.

Such alkanepolyol polymethacrylates and alkanepolyol polyacrylates presumably increase the rate of curing and the elasticity modulus of the resin components, thereby contributing to the surface hardness and smoothness of molded articles. They are incorporated in a proportion of 0 to 15 parts by weight, preferably 3 to 10 parts by weight, per 100 parts by weight of the unsaturated polyester resin composition composed of the unsaturated polyester, vinyl monomer and thermoplastic resin.

Impregnation of an inorganic or organic fibrous reinforcement material, preferably a glass fiber (for example, about 8 to 20 micrometers in diameter and ½ to 4 inches in length), with the resin composition comprising the ingredients mentioned above using conventional means and apparatus gives a sheet molding compound (SMC) or thick molding compound (TMC) or a bulk molding compound (BMC). Generally, the reinforcing fiber is incorporated in a proportion of about 10 to 40% by weight on the whole composition basis. Molded or shaped articles can be produced by curing the SMC or TMC or BMC under compression in molds at a pressure of about 0.1 to 20 kgf/cm², preferably about 0.5 to 20 kgf/cm², more preferably about 2 to 10 kgf/cm², the most preferably about 4 to 10 kgf/cm², and a temperature of about 50° to 120° C., preferably about more 60° to 100° C., more preferably about 70° to 95° C., the most preferably 75° to 90° C.

Further, SMC, TMC and BMC of the present invention can be molded at a low temperature i.e. 50°–120° C. under a low pressure i.e. about 0.1-20 kgf/cm², and they can also be molded together with a thermoplastic film or sheet, foam, non-woven fabric, cloth, paper, etc., which cannot be used in a method shown in prior art references. By chosing one or more of colored or printed thermoplastic film, sheet, non-woven fabric, close, paper, etc., a molded article which has various color, pattern, figure and pattern on the surface and has various good properties such as weather resistance, gloss, surface smoothness, surface hardness, flame resistance, staining resistance, etc. can be produced.

As a material of thermoplastic film or sheet usable in the present invention, there may be mentioned polyethylene (PE), polypropylene (PP), polyethylene terephthalate (PET), polybuthylene terephthalate (PBT), polyvinyl chloride (PVC), polyamide, polyvinylalcohol, polyvinylidene chloride, polymethylmethacrylate (PMMA), polyvinylidene fluoride (PVDF), polytetrafluoroethylene (PTFE), tetrafluoroethylene-hexafluoropropylene copolymer (PFEO), ethylene-tetrafluoroethylene copolymer (PETFE), acryl, ABS, polyurethane, polystyrene, polyvinylacetate, etc.

The unsaturated polyester resin molding composition of the invention, which comprises, as essential ingredients, the above-mentioned unsaturated polyester, vinyl monomer, stabilizer, thermoplastic resin, organic peroxide, fluidity modifier, thickening agent and filler as incorporated in specific proportions, together with the fibrous reinforcement material impregnated therewith, is excellent particularly in storage stability and shows good fluidity, filling property and curability under low-temperature, low-pressure molding conditions. To sum up, said composition comprises 100 parts by weight of an unsaturated polyester resin composition comprising 20 to 50 parts by weight, preferably 25 to 35 parts by weight, of an unsaturated polyester, 20 to 60 parts by weight, preferably 30 to 50 parts by weight of a vinyl monomer and 5 to 40 parts by weight, preferably 15 to 30 parts by weight, of a thermoplastic resin, 0.01 to 1.0 part by weight, preferably 0.05 to 0.5 part by weight, more preferably 0.2 to 0.5 parts by weight, of a stabilizer, 0.5 to 5 parts by weight, preferably 1.0 to 3.0 parts by weight, of an organic peroxide, 0.1 to 5 parts by weight, preferably 0.2 to 3.0 parts by weight, of a fluidity modifier, 0.05 to 2.0 parts by weight, preferably 0.2 to 1.0 weight part, more preferably 0.3 to 0.8 part by weight, of a thickening agent, and 50 to 200 parts by weight, preferably 80 to 180 parts by weight, more preferably 100 to 160 parts by weight, of a filler.

If the proportion of any ingredient is outside the corresponding range mentioned above, the viscosity of the resin composition after thickening may deviate from the viscosity range suited for molding (500,000 to 30,000,000 cps, preferably 2,000,000 to 20,000,000 cps, at 25° C.), rendering it impossible to perform molding under the low-temperature, low-pressure conditions mentioned above. In particular when the stabilizer content is below 0.01 part by weight, the storage stability of the resin composition will be insufficient. Conversely when said content is above 1.0 part by weight, the rate of curing in the curing step will be slow and the curing and crosslinking reaction at a low temperature of about 50° to 120° C. may proceed to an insufficient extent, giving molded articles insufficient in strength.

The following examples, Examples 1 to 12 and Comparative Examples 1 to 7, are further illustrative of the invention.

EXAMPLE 1

A resin composition was prepared by mixing up 33 weight parts of an unsaturated polyester (A-1), 14 weight parts of an unsaturated polyester (A-2), 10 weight parts of polystyrene as a thermoplastic resin for a low profile additives, 7 weight parts of a urethane adipate as a thermoplastic resin for a low profile additive, 36 weight parts of styrene, 1.5 weight parts of tertiary-amyl peroxyethylhexanoate as an organic peroxide, 0.05 weight part of di-tertiarybutylhydroxytoluene as a stabilizer, 0.5 weight part of finely divided silica as a fluidity modifier, 120 weight parts of aluminum hydroxide as a filler, 6.0 weight parts of zinc stearate as an internal mold releasing agent, and 0.4 weight part of magnesium oxide as a thickening agent. This resin composition was used to impregnate 64 weight parts of a glass fiber (1 inch in fiber length) therewith using a per se known SMC impregnator and the whole was sandwiched between polyethylene films to give an SMC sheet with a thickness of 2 to 4 mm.

Said SMC was measured for curing characteristics at 60° C. and 80° C., for storage stability at 20° C. and for fluidity in molding at a mold temperature of 80° C. The results obtained are shown below in Table 1, the data shown indicate that said SMC cured in 4 hours at 60° C. and in 20 minutes at 80° C. The storage life at 20° C. was 90 days and the fluidity at an upper and lower mold half temperature of 80° C. and a molding pressure of 10 kgf/cm² or 2 kgf/cm² was good. Said SMC was thus found to be a material suited for low-temperature, low-pressure molding and free of any problem from the practical viewpoint.

EXAMPLE 2

To improve the surface properties and curability of moldings, 5.0 weight parts of trimethylolpropane trimethacrylate was added to the formulation of Example 1 and an SMC was obtained by proceeding otherwise in the same manner as in Example 1. This SMC was more rapidly curable than that of Example 1. Thus, it cured in 3.5 hours at 60° C. and in 17 minutes at 80° C. and gave improved surface properties to the moldings. Its storage life at 20° C. was 45 days. It showed good fluidity at an upper and lower mold half temperature of 80° C. and a molding pressure of 10 kgf/cm$^2$ or 2 kgf/cm$^2$. As a low-temperature, low-pressure molding material, it was thus found problem-free from the practical viewpoint.

EXAMPLE 3

To improve the curability, 1.0 weight part of cobalt acetylacetonate was added, as a curing promoter, to the formulation of Example 1 and an SMC was obtained by proceeding otherwise in the same manner as in Example 1. This SMC was more rapidly curable than that of Example 1. Thus, it cured in 3 hours at 60° C. and in 15 minutes at 80° C. Its storage life at 20° C. was shorter, namely 32 days, but it showed good fluidity at an upper and lower mold half temperature of 80° C. and a molding pressure of 10 kgf/cm$^2$ or 2 kgf/cm$^2$. As a low-temperature, low-pressure molding material, it was thus problem-free from the practical viewpoint.

EXAMPLE 4

To improve the storage stability, the proportion of the stabilizer di-tertiary-butylhydroxytoluene in the formulation of Example 1 was increased to 0.1 weight part and an SMC was obtained by proceeding otherwise in the same manner as in Example 1. This SMC was curable more slowly than that of Example 1. Thus, it cured in 5 hours at 60° C. and in 23 minutes at 80° C. Its storage life at 20° C. was longer, namely 180 days, demonstrating an improvement in storage stability. It showed good fluidity at an upper and lower mold half temperature of 80° C. and a molding pressure of 10 kgf/cm$^2$ or 2 kgf/cm$^2$. As a low-temperature, low-pressure molding material, it was thus problem-free from the practical viewpoint.

EXAMPLE 5

To further improve the storage stability, the proportion of the stabilizer di-tertiary-butylhydroxytoluene in the formulation of Example 1 was increased to 0.5 weight part and an SMC was obtained by proceeding in the same manner as in Example 1. This SMC was curable more slowly than that of Example 1. Thus, it cured in 12 hours at 60° C. and in 60 minutes at 0° C. Its storage life at 20° C. was as long as 360 days, demonstrating a further improvement in storage stability. It showed good fluidity at an upper and lower mold half temperature of 80° C. and a molding pressure of 10 kgf/cm$^2$ or 2 kgf/cm$^2$. As a low-temperature, low-pressure molding material, it was thus problem-free from the practical viewpoint.

EXAMPLE 6

To examine the influence of the proportion of the fluidity modifier on the fluidity under low-temperature, low-pressure molding conditions, the proportion of finely divided silica, the fluidity modifier, in the formulation of Example 1 was increased to 3.0 weight parts and an SMC was obtained by proceeding otherwise in the same manner as in Example 1. This SMC was comparable in curability to that of Example 1. Thus, it cured in 4 hours at 60° C. and in 20 minutes at 80° C. Its storage life at 20° C. was the same as that of the SMC of Example 1, namely 90 days. It showed good fluidity at an upper and lower mold half temperature of 80° C. and a molding pressure of 10 kgf/cm$^2$ or 2 kgf/cm$^2$. As a low-temperature, low-pressure molding material, it was problem-free from the practical viewpoint.

EXAMPLE 7

An SMC was produced in the same manner as in Example 1 except that the proportion of the fluidity modifier, namely finely divided silica, in the formulation of Example 1 was increased to 5.0 weight parts. This SMC was comparable in curability to that of Example 1. Thus, it cured in 4 hours at 60° C. and in 20 minutes at 80° C. Its storage life at 20° C. was equally 90 days. It showed good fluidity at an upper and lower mold half temperature of 80° C. and a molding pressure of 10 kgf/cm$^2$. As a low-temperature, low-pressure molding material, it was problem-free from the practical viewpoint.

EXAMPLE 8

To examine the influence of the proportion of the filler on the fluidity under low-temperature, low-pressure molding conditions, the proportion of the filler aluminum hydroxide in the formulation of Example 1 was reduced to 100 weight parts and an SMC was produced by proceeding otherwise in the same manner as in Example 1. This SMC was comparable in curability to that of Example 1. Thus, it cured in 4 hours at 60° C. and in 20 minutes at 80° C. Its storage life at 20° C. was equally 90 days. It showed good fluidity at an upper and lower mold half temperature of 80° C. and a molding pressure of 10 kgf/cm$^2$. As a low-temperature, low-pressure molding material, it was problem-free from the practical viewpoint.

EXAMPLE 9

To examine the influence of the proportion of the filler on the fluidity under low-temperature, low-pressure molding conditions, the proportion of the filler aluminum hydroxide in the formulation of Example 1 was increased to 150 weight parts and an SMC was prepared by proceeding otherwise in the same manner as in Example 1. This SMC was comparable in curability to that of Example 1. Thus, it cured in 4 hours at 60° C. and in 20 minutes at 80° C. Its storage life at 20° C. was equally 90 days. It showed good fluidity at an upper and lower mold half temperature of 80° C. and a molding pressure of 10 kgf/cm$^2$ As a low-temperature, low-pressure molding material, it was problem-free from the practical viewpoint.

EXAMPLE 10

To examine the influence of the difference in kind of filler on the fluidity under low-temperature, low-pressure molding conditions, the filler aluminum hydroxide in the formulation of Example 1 was replaced with 100 weight parts of calcium carbonate and an SMC was produced by proceeding otherwise in the same manner as in Example 1. This SMC was comparable in curability to that of Example 1. Thus, it cured in 4 hours at 60°

C. and in 20 minutes at 80° C. Its storage life at 20° C. was equally 90 days. It showed good fluidity at an upper and lower mold half temperature of 80° C. and a molding pressure of 10 kgf/cm². As a low-temperature, low-pressure molding material, it was problem-free from the practical viewpoint.

EXAMPLE 11

To examine the influence of the difference in kind of filler on the fluidity under low-temperature, low-pressure molding conditions, the filler aluminum hydroxide in the formulation of Example 1 was replaced with 180 weight parts of calcium carbonate and an SMC was produced by proceeding otherwise in the same manner as in Example 1. This SMC was comparable in curability to that of Example 1. Thus, it cured in 4 hours at 60° C. and in 20 minutes at 80° C. Its storage life was equally 90 days. It showed good fluidity at an upper and lower mold half temperature of 80° C. and a molding pressure of 10 kgf/cm². As a low-temperature, low-pressure molding material, it was problem-free from the practical viewpoint.

EXAMPLE 12

An SMC was produced in the same manner as in Example 1 except that 0.01 weight part of parabenzoquinone was added, as a polymerization inhibitor, to the formulation of Example 1. This SMC was curable more slowly than that of Example 1. Thus, it cured in 4.5 hours at 60° C. and in 22 minutes at 80° C. Its storage life at 20° C. was 120 days. It showed good fluidity at an upper and lower mold half temperature of 80° C. and a molding pressure of 10 kgf/cm². As a low-temperature, low-pressure molding material, it was problem-free from the practical viewpoint.

COMPARATIVE EXAMPLE 1

To examine the influence of the fluidity modifier on the fluidity under low-temperature, low-pressure molding conditions, the fluidity modifier (finely divided silica) was omitted from the formulation of Example 1 and an SMC was produced by proceeding otherwise in the same manner as in Example 1. This SMC was comparable in curability and storage stability to that of Example 1 (cf. Table 2). However, it showed inadequate fluidity at an upper and lower mold half temperature of 80° C. and a molding pressure of 10. kgf/cm² and 20 kgf/cm², with insufficient filling thereof into the terminal portions of moldings and into the rib and boss portions. It was thus unsuited for use as a low-temperature, low-pressure molding material.

COMPARATIVE EXAMPLE 2

An SMC was produced in the same manner as in Example 1 except that the stabilizer di-tertiarybutylhydroxytoluene in the formulation of Example 1 was replaced with 0.05 weight part of the polymerization inhibitor parabenzoquinone. This SMC was curable more slowly than that of Example 1. Thus, it cured in 5.5 hours at 60° C. and in 25 minutes at 80° C. However, its storage life at 20° C. was as short as 15 days, presenting a problem of practical importance.

COMPARATIVE EXAMPLE 3

An SMC was produced in the same manner as in Example 1 except that 0.12 weight part of parabenzoquinone was added, as a polymerization inhibitor, to the formulation of Example 1. This SMC was curable considerably slower than that of Example 1. Thus, it did not cure at 60° C. and cured in 2 hours or more at 80° C. Its storage life at 20° C. was 360 days. It showed poor fluidity and filling property at an upper and lower mold half temperature of 80° C. and a molding pressure of 10 kgf/cm² and 20 kgf/cm². Thus, it failed to serve as a low-temperature, low-pressure molding material.

COMPARATIVE EXAMPLE 4

An SMC was produced in the same manner as in Example 1 except that the stabilizer di-tertiarybutylhydroxytoluene in the formulation of Example 1 was used in an amount of 1.2 weight part. This SMC was curable more slowly than that of Example 1. Thus, it did not cure at 60° C. and cured in 2.5 hours at 80° C. Its storage file at 20° C. was not less than 120° C. days. It showed poor fluidity and filling property at an upper and lower mold half temperature of 80° C. and a molding pressure of 10 kgf/cm² and 20 kgf/cm². Thus it failed to serve as a low-temperature, low-pressure molding material.

COMPARATIVE EXAMPLE 5

An SMC was produced in the same manner as in Example 1 except that the filler aluminum hydroxide was used in an amount of 220 weight parts. This SMC was almost the same in curability as that of Example 1. Thus, it cured in 4 hours at 60° C. and in 20 minutes at 80° C. However, the viscosity of this molding composition at 25° C. was not less than 60,000,000 cps after thickening because the amount of the filler in this composition was too much. It showed poor fluidity and filling property at an upper and lower mold half temperature of 80° C. and a molding pressure of 10 kgf/cm² and 20 kgf/cm². Thus, it failed to serve as a low-temperature, low-pressure molding material.

COMPARATIVE EXAMPLE 6

An SMC was produced in the same manner as in Example 1 except that a fluidity modifier finely divided silica was used in an amount of 7.0 weight parts. This SMC was comparable in curability to that of Example 1. Thus, it cured in 4 hours at 60° C. and in 20 minutes at 80° C. However, the viscosity of this molding composition at 25° C. was not less than 50,000,000 cps after thickening because the amount of the fluidity modifier in this composition was too much. It showed poor fluidity and filling property at an upper and lower mold half temperature of 80° C. and a molding pressure of 10 kgf/cm² and 20 kgf/cm². Thus it failed to serve as a low-temperature, low-pressure molding material.

COMPARATIVE EXAMPLE 7

An SMC was produced in the same manner as in Example 1 except that a thickening agent, magnesium oxide, was used in an amount of 2.2 weight parts. This SMC was comparable in curability to that of Example 1. Thus, it cured in 4 hours at 60° C. and in 20 minutes at 80° C. However, the viscosity of the molding composition at 25° C. was not less than 80,000,000 cps after thickening because the amount of the thickening agent in this composition was too much. It showed poor fluidity and filling property at an upper and lower mold half temperature of 80° C. and a molding pressure of 10 kgf/cm² and 20 kgf/cm². Thus it failed to serve as a low-temperature, low-pressure molding material.

The following measurement methods (1) to (3) were used.

(1) Curing characteristics at 60° C. and 80° C. (exotherm curve method)

A piece of SMC, 8 mm in thickness and 50 mm×50 mm in size, was placed in the middle of a mold the upper and lower halves of which were maintained at the same temperature of 60° C. or 80° C. (the mold temperature being adjustable to the minimum unit of 0.1° C.), with a thermocouple inserted into the SMC to a depth of 4 mm, and pressing was performed in that state. On that occasion, 4-mm-thick spacers were arranged within the mold to attain a constant thickness. The gel time (G.T.) and cure time (C.T.) were calculated from the temperature-time curve obtained.

(2) Storage stability at 20° C.

The resin composition was placed in a 600-cc ointment bottle and allowed to stand in a room maintained at 20° C. for storage stability evaluation. For judging as to whether gelation had taken place or not, an iorn rod, 2 mm in diameter and 120 mm in length, was vertically inserted into the resin composition. If the rod front end failed to reach the ointment bottle bottom, it was judged that gelation had taken place.

(3) Fluidity in molding at 80° C.

Press molding was performed using a mold of 500 mm × 1,000 mm in size under the following conditions: upper and lower mold half temperature: 80° C.; molding pressure: 2 kgf/cm$^2$, 10 kgf/cm$^2$ and 20 kgf/cm$^2$; covering ratio: 36%; material weight: 3 kg. The material was in the form of SMC and the thickness of the shaped article was 3 mm. Fluidity judgment was made by the eye as to whether the material was found filled in the termini of the shaped article and in the ribs and bosses attached to the shaped article.

[TABLE 1]

| Component | Example 1 | 2 | 3 | 4 | 5 | 6 | 7 | 8 | 9 | 10 | 11 | 12 |
|---|---|---|---|---|---|---|---|---|---|---|---|---|
| A-1 | 33 | 33 | 33 | 33 | 33 | 33 | 33 | 33 | 33 | 33 | 33 | 33 |
| A-2 | 14 | 14 | 14 | 14 | 14 | 14 | 14 | 14 | 14 | 14 | 14 | 14 |
| B-1 | 10 | 10 | 10 | 10 | 10 | 10 | 10 | 10 | 10 | 10 | 10 | 10 |
| B-2 | 7 | 7 | 7 | 7 | 7 | 7 | 7 | 7 | 7 | 7 | 7 | 7 |
| C | 36 | 36 | 36 | 36 | 36 | 36 | 36 | 36 | 36 | 36 | 36 | 36 |
| D | — | 5.0 | — | — | — | — | — | — | — | — | — | — |
| E | 1.5 | 1.5 | 1.5 | 1.5 | 1.5 | 1.5 | 1.5 | 1.5 | 1.5 | 1.5 | 1.5 | 1.5 |
| F-1 | 0.05 | 0.05 | 0.05 | 0.1 | 0.5 | 0.05 | 0.05 | 0.05 | 0.05 | 0.05 | 0.05 | 0.05 |
| F-2 | — | — | — | — | — | — | — | — | — | — | — | 0.01 |
| G | — | — | 1.0 | — | — | — | — | — | — | — | — | — |
| H-1 | 120 | 120 | 120 | 120 | 120 | 120 | 120 | 100 | 150 | — | — | 120 |
| H-2 | — | — | — | — | — | — | — | — | — | 100 | 180 | — |
| I | 0.5 | 0.5 | 0.5 | 0.5 | 0.5 | 3.0 | 5.0 | 0.5 | 0.5 | 0.5 | 0.5 | 0.5 |
| J | 6.0 | 6.0 | 6.0 | 6.0 | 6.0 | 6.0 | 6.0 | 6.0 | 6.0 | 6.0 | 6.0 | 6.0 |
| K | 0.4 | 0.4 | 0.4 | 0.4 | 0.4 | 0.4 | 0.4 | 0.4 | 0.4 | 0.4 | 0.4 | 0.4 |
| L | 64 | 64 | 64 | 64 | 64 | 64 | 64 | 64 | 64 | 64 | 64 | 64 |
| 60° C. G.T. (min.) | 170 | 159 | 118 | 247 | 542 | 170 | 170 | 170 | 170 | 170 | 170 | 222 |
| 60° C. C.T. (min.) | 215 | 189 | 145 | 284 | 627 | 215 | 215 | 215 | 215 | 215 | 215 | 260 |
| 80° C. G.T. (min.) | 13.1 | 12.4 | 10.6 | 16.2 | 43.5 | 13.1 | 13.1 | 13.1 | 13.1 | 13.1 | 13.1 | 15.1 |
| 80° C. C.T. (min.) | 16.0 | 14.5 | 13.3 | 19.0 | 48.7 | 16.0 | 16.0 | 16.0 | 16.0 | 16.0 | 16.0 | 18.2 |
| Storage stability at 20° C. (days) | 90 | 45 | 32 | 180 | 360 | 90 | 90 | 90 | 90 | 90 | 90 | 120 |
| Fluidity 10 kgf/cm$^2$) | Good | Good | Good | Good | Good | Good | Good | Good | Good | Good | Good | Good |
| Fluidity (2 kg/cm$^2$) | Good | Good | Good | Good | Good | Good | | | | | | |

Notes:
Fluidity evaluation was made according to the following criteria:
Poor: Insufficient filling in the molding termini, insufficient filling in the ribs and bosses.
Good: Sufficient filling in the molding termini, sufficient filling in the ribs and bosses.

[TABLE 2]

| Component | Comparative Example 1 | 2 | 3 | 4 | 5 | 6 | 7 |
|---|---|---|---|---|---|---|---|
| A-1 | 33 | 33 | 33 | 33 | 33 | 33 | 33 |
| A-2 | 14 | 14 | 14 | 14 | 14 | 14 | 14 |
| B-1 | 10 | 10 | 10 | 10 | 10 | 10 | 10 |
| B-2 | 7 | 7 | 7 | 7 | 7 | 7 | 7 |
| C | 36 | 36 | 36 | 36 | 36 | 36 | 36 |
| D | — | — | — | — | — | — | — |
| E | 1.5 | 1.5 | 1.5 | 1.5 | 1.5 | 1.5 | 1.5 |
| F-1 | 0.05 | — | 0.05 | 1.2 | 0.05 | 0.05 | 0.05 |
| F-2 | — | 0.05 | 0.12 | — | — | — | — |
| G | — | — | — | — | — | — | — |
| H-1 | 120 | 120 | 120 | 120 | 220 | 120 | 120 |
| H-2 | — | — | — | — | — | — | — |
| I | — | 0.5 | 0.5 | 0.5 | 0.5 | 7.0 | 0.5 |
| J | 6.0 | 6.0 | 6.0 | 6.0 | 6.0 | 6.0 | 6.0 |
| K | 0.4 | 0.4 | 0.4 | 0.4 | 0.4 | 0.4 | 2.2 |
| L | 64 | 64 | 64 | 64 | 64 | 64 | 64 |
| 60° C. G.T. (min.) | 170 | 263 | 1080 | 1210 | 170 | 170 | 170 |
| 60° C. C.T. (min.) | 215 | 302 | 1210 | 1460 | 215 | 215 | 215 |

[TABLE 2]-continued

| Component | Comparative Example | | | | | | |
|---|---|---|---|---|---|---|---|
| | 1 | 2 | 3 | 4 | 5 | 6 | 7 |
| 80° C. G.T. (min.) | 13.1 | 17.5 | 66.7 | 78.9 | 13.1 | 13.1 | 13.1 |
| 80° C. C.T. (min.) | 16.0 | 21.3 | 81.2 | 90.3 | 16.0 | 16.0 | 16.0 |
| Storage stability at 20° C. (days) | 90 | 15 | 360 | 360 | 90 | 90 | 90 |
| Fluidity (10 kgf/cm$^2$) | Poor | Poor | Poor | Poor | Poor | Poor | Poor |
| Fluidity (20 kgf/cm$^2$) | Poor | Good | Poor | Poor | Poor | Poor | Poor |

Notes:
Fluidity evaluation was mad according to the following criteria:
Poor: Insufficient filling in the molding termini, insufficient filling in the ribs and bosses.
Good: Sufficient filling in the molding termini, sufficient filling in the ribs and bosses.

In Table 1 and Table 2, the following symbols are used:

A-1: An unsaturated polyester synthesized from 1.0 mole of propylene glycol, 0.2 mole of dicyclopentadiene and 1.0 mole of maleic anhydride. Its 65% (by weight) solution in styrene had a viscosity of 1,200±100 cps at 25° C. and an acid value of 24±3. In the tables, the proportion of the unsaturated polyester, exclusive of the diluent styrene, is given 10 in parts by weight.

A-2: An unsaturated polyester synthesized from 0.3 mole of propylene glycol, 0.7 mole of neopentyl glycol, 0.7 mole of maleic anhydride and 0.3 mole of isophthalic acid. Its 55% (by weight) solution in styrene had a viscosity of 1,350±100 cps at 25° C. and an acid value of 25±3. In the tables, the proportion of the unsaturated polyester, exclusive of the diluent styrene, is given in parts by weight.

B-1: Polystyrene.
B-2: Urethane adipate.
C: Styrene. In the tables, the amount of styrene, inclusive of the diluent styrene used for diluting the unsaturated polyester, polystyrene and urethane adipate, is given in parts by weight.
D: Trimethylolpropane trimethacrylate.
E: Tertiary-amyl peroxy-2-ethylhexanoate.
F-1: Di-tertiry-butylhydroxytoluene.
F-2: Parabenzoquinone.
G: Cobalt acetylacetonate.
H-1: Aluminum hydroxide.
H-2: Calcium carbonate.
I: Finely divided silica.
J: Zinc stearate.
K: Magnesium oxide.
L: Glass fiber (13 μ in diameter, 1 inch in length).

Because of its containing a stabilizer and a fluidity modifier, the unsaturated polyester resin molding composition of the invention can be cured to a satisfactory extent even under low-temperature, low-pressure molding conditions (50° to 120° C., about 0.1 to 20 kgf/cm$^2$) and can flow readily within the mold and completely fill in ribs and bosses complicated in shape. The conventional unsaturated polyester molding compositions can never show such behavior. The molded articles obtained from the composition of the invention are comparable in strength to the products obtained under the conventional molding conditions. Furthermore, the unsaturated polyester resin molding composition of the invention is excellent in storage stability at room temperature. Therefore, even during a prolonged period of storage, it will not change in curability nor fluidity. Said composition is thus of very great significance from the practical viewpoint.

We claim:

1. A method of producing a molded article which comprises subjecting a composition which comprises
   A. about 90% to 60% by weight of a composition comprising
      (1) 20 to 50 parts per 100 parts by weight of an unsaturated polyester,
      (2) 20 to 60 parts per 100 parts by weight of a vinyl monomer,
      (3) 5 to 40 parts per 100 parts by weight of a thermoplastic resin,
      (4) 0.01 to 1.0 parts per 100 parts by weight of di-tertiary-butyl-hydroxytoluene,
      (5) 0.5 to 5 parts per 100 parts by weight of an organic peroxide,
      (6) 0.1 to 5 parts per 100 parts by weight of finely divided silica,
      (7) 0.05 to 2 parts per 100 parts by weight of an oxide, a hydroxide or an alcoholate of magnesium or calcium or an alcoholate of aluminum, and
      (8) 50 to 200 parts per 100 parts by weight of a filler, and
   B. about 10% to 40% by weight of a glass fiber reinforcement material, to a pressure of about 0.5 to 10 kgf/cm$^2$ and a temperature of about 60° to 100° C.

2. A method according to claim 1 wherein the component (7) is magnesium oxide or magnesium hydroxide.

* * * * *